United States Patent Office 3,057,926
Patented Oct. 9, 1962

3,057,926
SULFUR-CONTAINING PHENOLIC COMPOUNDS
Thomas H. Coffield, Farmington, Mich., assignor to Ethyl Corporation, New York, N.Y., a corporation of Delaware
No Drawing. Filed Mar. 12, 1958, Ser. No. 720,825
3 Claims. (Cl. 200—609)

This invention deals with a novel class of organic compounds which are eminently suited to the protection of synthetic hydrocarbon polymers from oxidative deterioration.

It is an object of this invention to provide a novel class of phenolic compounds. A further object is to provide a special class of phenolic sulfur compounds which have outstanding antioxidant properties when used in small amounts in certain synthetic hydrocarbon polymers. A further object is to provide as a new composition of matter, synthetic hydrocarbon polymers which are stabilized by the phenolic sulfur compounds herein disclosed. A specific object of this invention is to provide polyethylene which possesses outstanding oxidative stability.

The objects of this invention are accomplished by a compound having the formula:

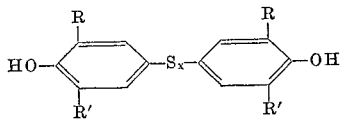

wherein R is an alkyl group branched on the alpha carbon atom and having from 3 to 4 carbon atoms inclusive and R' is a member of a class consisting of alkoxy groups having from 1 to 4 carbon atoms and alkyl groups having from 1 to 4 carbon atoms, and $x$ is an integer from 1 to 3 inclusive.

Examples of the compounds of this invention include: 4,4'-thiobis(2,6-di-tert-butylphenol), 4,4'-thiobis(2-methyl-6-isopropylphenol), 4,4'-thiobis(2-ethyl-6-sec-butyl-phenol), 4,4'-thiobis(2,6-diisopropylphenol), 4,4'-thiobis(2-methyl-6-tert-butylphenol), 4,4'-thiobis(2-n-butoxy-6-tert-butylphenol), 4,4'-thiobis(2-methoxy-6-sec-butylphenol), 4,4'-dithiobis(2-n-propyl-6-tert-butylphenol), 4,4'-trithiobis(2-methyl-6-tert-butylphenol) and the like.

The alkyl radical represented by R in the above formula includes the isopropyl group, the tert-butyl group and the secondary butyl group. It has been discovered that the novel compounds containing these groups are readily prepared and are extremely effective antioxidants in synthetic hydrocarbon polymers as will be described in more detail below. Those compounds in which R is a tert-butyl or isopropyl group are preferred as it has been found that they are among the more outstanding antioxidants for saturated hydrocarbon polymers discovered to date. Particularly preferred compounds are those in which $x$ in the above formula is 1, i.e. the 4,4'-thiobis(2,6-di-substituted phenol) compounds. Of these, 4,4'-thiobis-(2-methyl-6-tert-butylphenol) and 4,4'-thiobis(2,6-di-tert-butylphenol) are the most particularly preferred due to their low cost and outstanding antioxidant activities.

The compounds of this invention may be prepared by several processes. One of these consists of reacting the parent phenolic compound (for example, 2-methyl-6-tert-butylphenol) with a surfur chloride. Either sulfur monochloride, $S_2Cl_2$, or sulfur dichloride, $SCl_2$, may be used. In general, the products of these reactions are the thiobis-phenols of this invention having one or more sulfur atoms between the two phenolic rings. However, the polythiophenols of this invention are also produced by the reaction of a sulfur chloride with the parent phenol. When a compound having 2 or 3 sulfurs bridging the phenolic rings is desired, the product of the sulfur chloride-phenol reaction may be further reacted with free sulfur.

A special method is applicable to the preparation of a particular compound of this invention, namely, 4,4'-thiobis(2,6-di-tert-butylphenol). Whereas this compound is produced by the reaction of sulfur dichloride with 2,6-di-tert-butylphenol, it has also been found to be susceptible to preparation by a process which comprises the reaction of the alkali metal salt of 2,6-di-tert-butylphenol with sulfur dichloride. This method of preparation is not applicable to other compounds of this invention as the phenol starting materials do not have alkali metal salts which are the chemical equivalent of the salt of 2,6-di-tert-butylphenol.

The following examples, in which all parts are by weight, are illustrative of the methods for preparing the compounds of this invention.

Example I

A solution of 32.8 parts of 2-methyl-6-tert-butylphenol in 18 parts petroleum ether (B. 36–38°) was stirred while a solution of 10.3 parts of freshly distilled $SCl_2$ in 5 parts petroleum ether was added slowly at 15–20°. The exothermic reaction was controlled with external cooling. After half the $SCl_2$ solution had been added, the reaction mixture was stirred at 20–28° C. for one-half hour. The rest of the $SCl_2$ was then added slowly at 20° and then the mixture was stirred at 24–28° for 2 hours. The reaction mixture was filtered, and the addition of a small amount of fresh solvent caused precipitation of a crystalline product. After washing with solvent, 22.3 parts of the crude product were recovered. This represents 62.3 percent yield of 4,4'-thiobis(2-methyl-6-tert-butylphenol) having a melting point of 114–117.5°. Treatment with activated charcoal and recrystallization from cyclohexane gave white crystals having a melting point of 124–125° C. Analysis of the compound showed it to contain about 9.05 percent sulfur. The calculated sulfur content for 4,4'-thiobis(2-methyl-6-tert-butylphenol) is 8.94 percent.

Example II 2-methyl-6-tert-butylphenol (4920 parts) was dissolved in 2700 parts of low boiling petroleum ether. The mixture was charged to a stirred reaction vessel equipped with external cooling means. To the stirred reaction vessel was added 1545 parts of sulfur dichloride contained in 750 parts of low boiling petroleum ether in the following manner: The reaction vessel was maintained at between 15–17° C. while the sulfur dichloride solution was slowly added. After about 45 percent of the sulfur dichloride had been added, a white solid precipitated making the reaction mass extremely viscous and raising the temperature of the reactor to about 18° C. At this point, 1200 additional parts of petroleum ether were added so that the reaction mixture could be easily agitated. As the additional sulfur dichloride was added, more solvent was periodically added to maintain the reaction mass in a sufficiently fluid condition to permit agitation. A total of 2400 additional parts of low boiling petroleum ether was added during the course of the addition of the sulfur dichloride. After the sulfur dichloride addition was completed, the reaction mass was warmed with stirring to 28° C. and maintained at between 28–30° C. for an additional hour. The reaction mass was then cooled to 10° C. and maintained at this temperature for one-half hour after which it was filtered and the solids pressed dry. The solids were then slurried with petroleum ether and the mixture was again filtered and pressed dry. Thirty-eight hundred parts of 4,4'-thiobis(2-methyl-6-tert-butylphenol) (a 71 percent yield) were recovered in this manner.

Example III

A solution of 227 parts of distilled $SCl_2$ and about 240 parts of petroleum ether (boiling point 36.5–38° C.) was added slowly with stirring to a solution of 712 parts of 2,6-diisopropylphenol in 400 parts of the petroleum ether. External cooling was applied to maintain the reaction mixture at about 17° C. About one-half the sulfur dichloride solution was added over a 30 minute period during which time the evolution of HCl gas indicated that the reaction was proceeding. After one-half the sulfur dichloride had been added, the solution was refluxed at 38° C. for one-half hour. The remaining sulfur dichloride was then slowly added over a half hour period while the temperature was maintained between 18 and 24° C. The mixture was again refluxed for 30 minutes and then treated with activated charcoal, filtered and additional petroleum ether added. This reaction produced 4,4'-thiobis(2,6-diisopropylphenol), a valuable antioxidant of this invention.

Example IV

To a glass reaction vessel was charged 4,000 parts of carbon tetrachloride, 444 parts of carbon disulfide and 515 parts of 2,6-di-tert-butylphenol. The mixture was cooled to −15° C. and 129 parts of sulfur dichloride was slowly added thereto over a one and one-half hour period. The mixture was then stirred at room temperature for one and one-houlf hour and then heated to 50° C. for 15 minutes. The volatiles were then removed under reduced pressure producing a mixture of solid and oil which was dissolved in ether and washed with aqueous sodium carbonate, water and then dried over magnesium sulfate. 4,4'-thiobis(2,6-tert-butylphenol) is recovered from this reaction mixture.

Example V

A solution of 34 parts of freshly distilled sulfur dichloride in about 25 parts of petroleum ether was slowly added with stirring to a solution of 123.6 parts of 2,6-di-tert-butylphenol in 60 parts of petroleum ether. One-half of the sulfur dichloride was added slowly at 20 to 25° C. and the mixture was heated to reflux, then cooled to 25° C. and the remaining sulfur dichloride was slowly added. Thereafter the mixture was kept at reflux for 99 hours. The solvent and volatiles were stripped under vacuum. Thereafter the resulting brownish-black oil was subjected to distillation and the residue was fractionally crystallized from methanol. The third fraction of crystals yielded 5 parts of 4,4'-thiobis(2,6-di-tert-butylphenol) having a melting point of 138–140° C. The compound was submitted for sulfur analysis and found to contain 7.5 per cent sulfur. The calculated composition of 4,4'-thiobis(2,6-di-tert-butylphenol) is 7.24 percent.

The methanol solution from which the 4,4'-thiobis(2,6-di-tert-butylphenol) was recovered was allowed to stand for an extended period of time during which an additional 2 grams of material crystallized. Recrystallization of this material from 95 percent methanol gave yellow crystals of 4,4'-trithiobis(2,6-di-tert-butylphenol) having a melting point of 129–130° C. The compound, on analysis, was shown to contain 19.0 percent sulfur. The calculated content for 4,4'-trithiobis(2,6-tert-butylphenol) is 18.97 percent sulfur.

Example VI

A solution of 656 parts of 2-methyl-6-tert-butylphenol in 360 parts of petrolium ether was charged to a glass reaction vessel. A solution of 204 parts of sulfur dichloride in about 60 parts of petroleum ether was added slowly while the reaction mass was maintained at 10–20° C. with the aid of external cooling. After a considerable portion of the sulfur dichloride solution had been added, the reaction mixture became turbid and there was evidence of HCl evolution. The addition of the sulfur dichloride solution was halted and the mixture was stirred for about 15 minutes after which time the remaining sulfur dichloride was slowly added and the temperature allowed to raise and was maintained at below 30° C. for one-half hour. After remaining over-night in the stirred reaction vessel, the mixture was filtered and the reaction mass then worked up as described in Example II. A 49.4 percent yield of 4,4'-thiobis(2-methyl-6-tert-butylphenol) having a melting point of 119-120° C. was recovered.

Example VII

Three hundred sixty parts of freshly redistilled ortho tert-butyl guaiacol with a boiling point of 117–121° C. at 6.5 millimeters was diluted with low boiling petroleum ether in a stirred reaction vessel and 103 parts of sulfur dichloride also diluted with low boiling petroleum ether, was slowly added at 10–15° C. After addition of the sulfur dichloride was complete, the reaction mixture was warmed to 30° C. and left to stand at room temperature for about two days. The reaction mixture was then washed first with water, then with aqueous sodium bicarbonate and again with water, and then dried over calcium sulfate. After drying, the solvent was removed in vacuo at 95° C. and 0.1 millimeter pressure, leaving 230 parts residue of 4,4'-dithiobis(2-methoxy-6-tert-butylphenol).

This compound, on analysis, was shown to contain 15.7 percent sulfur. The calculated content of 4,4'-dithiobis(2-methoxy-6-tert-butylphenol) is about 15.2 percent sulfur.

In a similar manner other 4,4'-thiobis(2-alkoxy-6-branched alkylphenol) compounds of this invention are prepared by reacting sulfur dichloride with 2-alkoxy-6-branched alkylphenol. Thus, 4,4'-thiobis(2-tert-butoxy-6-isopropylphenol) is prepared by reacting 2-tert-butoxy-6-isopropylphenol with sulfur dichloride.

Example VIII

A solution of 656 parts of 2-methyl-6-tert-butylphenol in 360 parts of petroleum ether was agitated while a solution of 270 parts of sulfur monochloride in 10 parts of the petroleum ether was added slowly at about 15° C. Additional petroleum ether was added during the course of the reaction to dilute the mixture and lessen the heat evolution. This procedure enables the sulfur monochloride to be added at a more rapid rate. During the addition of the sulfur monochloride, the temperature was lowered by external cooling and maintained at 7 to 10° C. The addition of sulfur monochloride was completed in 8 hours after which the mixture was heated to reflux for one hour then cooled and filtered. A solid precipitate was collected and washed with petroleum ether and dried. Three hundred twenty-two parts of 4,4'-thiobis(2-methyl-6-tert-butylphenol) having a melting point of 118–122° C. resulted. Recrystallization of this product from n-hexane gave white crystals melting at 122.5–123° C.

The reaction between the phenolic compound and sulfur chloride is exothermic and is preferably conducted at from about 5° to about 35° C. This is easily accomplished by external cooling of the reaction mixture while the reactants are under agitation.

A stoichiometric amount of phenol is employed in preparing the compounds of this invention. Thus, for each mole of sulfur chloride employed, two moles of phenol are present in the reaction mixture.

As is illustrated by the above example, it is convenient to conduct the preparation of the compounds of this invention in a suitable solvent. In general, the solvents applicable include low boiling hydrocarbons, halogenated hydrocarbons, and inert aromatic compounds such as nitrobenzene. Examples of suitable solvents include carbon tetrachloride, chloroform, n-hexane, 2,4-di-bromo pentane, low boiling petroleum ether and the like.

A preferred procedure consists of slowly adding one-half the sulfur chloride to the phenol and then allowing the reaction to proceed under agitation and proper conditions to maintain the desired temperature; and subsequently slowly adding the balance of the sulfur chloride which is also contained in a suitable solvent. After the entire amount of sulfur chloride has been added to the reaction vessel, agitation is allowed to continue at the selected temperature. Slow addition of the sulfur chloride prevents undesirable side reactions.

After initial filtration to remove solids, the compounds of this invention may then be separated from the reaction mixture by precipitation. In some cases the addition of excess fresh solvent causes precipitation of the product. The crude product may then be re-crystallized from a suitable solvent such as cyclohexane. Best results are obtained when extremely pure starting materials are employed in conducting the reaction to prepare a compound of this invention. It has been found that whereas the pure products of the reaction are insoluble in the reaction solvent, they become soluble when impurities are present. Thus, when pure starting materials are used, the possibility of the product being soluble in the reaction system is decreased. Often this solubility problem can be overcome by the addition of excess fresh solvent at the end of the reaction period to reduce the impurities to such a low concentration that the product is no longer soluble in the reaction medium.

*Example IX*

A glass reaction vessel was charged with 2061 parts of 2,6-di-tert-butylphenol in about 1800 parts of methanol. To this was aded a stoichiometric quantity of sodium methylate in about 2700 parts of methanol. This mixture was allowed to stand for several days at room temperature after which the methanol was removed under reduced pressure and about 4500 parts of tetrahydrofuran were added. The resulting tetrahydrofuran solution of sodium 2,6-di-tert-butylphenolate was treated with 721 parts of sulfur dichloride. The addition of the sulfur dichloride was made at 45–50° C. The reaction mixture was then stirred for one and one-half hours and heated at reflux for 15 minutes. After cooling, the mixture was poured into water and extracted with ether. The ether extracts were dried over magnesium sulfate. The resulting ether extract yields 4,4'-thiobis(2,6-di-tert-butylphenol), an antioxidant of this invention.

*Example X*

The procedure of Example II is followed except that 960 parts of sulfur are added to the reaction mixture after addition of the sulfur dichloride. A good yield of 4,4'-dithiobis(2-methyl-6-tert-butylphenol) results.

The novel compounds of this invention have been found to be outstandingly effective antioxidant additives for saturated hydrocarbon synthetic polymers. Thus, an embodiment of this invention is a novel composition of matter comprising a saturated hydrocarbon synthetic polymer derived from polymerization of an aliphatic monoolefin hydrocarbon compound having up to 4 carbon atoms and a small antioxidant quantity, up to 5 percent, of a compound having the formula:

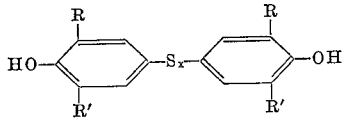

wherein R is an alkyl group branched on the alpha carbon and having from 3 to 4 carbon atoms inclusive and R' is a member of a class consisting of alkoxy groups having from 1 to 4 carbon atoms, and alkyl groups having from 1 to 4 carbon atoms and $x$ is an integer from 1 to 3 inclusive.

The saturated hydrocarbon synthetic polymer which has greatly enhanced oxidative stability by the practice of this invention, includes polymers obtained from the polymerization of a hydrocarbon monoolefin having up to 4 carbon atoms. Examples of such monomers include ethylene, propylene, butylene and isobutylene. Thus, the polymers are homopolymers and copolymers of ethylene, propylene, butylene and isobutylene.

A preferred embodiment of this invention is polyethylene containing a small antioxidant quantity, up to about 5 percent, of a 4,4'-thiobis(substituted phenol) as defined above. A particularly preferred embodiment of this invention comprises polyethylene containing from about 0.01 to about 2 percent of such a 4,4'-thiobis(substituted phenol). In particular it has been found that when from 0.01 to about 2 percent of 4.4'-thiobis(2-methyl-6-tert-butylphenol) is incorporated with polyethylene, compositions of outstanding oxidative stability result. Another particularly effective compound within the scope of this invention is 4,4'-thiobis(2,6-di-tert-butylphenol).

Polyethylene is a hydrocarbon polymer derived from the polymerization of ethylene. This polymerization can be accomplished by a great variety of methods which lead to products of diverse properties. Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization-favoring quantities of oxygen under relatively high pressures in excess of 500 or 1,000 atmospheres at temperatures between 150 and 275° C. Or, if desired, they may be similar to the essentially linear and unbranched polymers ordinarily having greater molecular weights which may be obtained under relatively low pressures of 1 to 100 atmospheres using such catalysts to polymerize the ethylene as mixtures of strong reducing agents and compounds of group IVB, VB and VIB metals of the periodic system; chromium oxile on silicated alumina; hexavalent molybdenum compounds; and charcoal supported nickel-cobalt. The polyethylene which results from these various polymerization processes may have a molecular weight in the range from 1300 to over 1,000,000 depending on the particular conditions of polymerization employed.

The benefits derived from the practice of this invention are demonstrated by comparative oxidation tests of uninhibited polyethylene and polyethylene containing an antioxidant of this invention. These tests are conducted as follows: The selected amount of antioxidant is blended with the polyethylene by milling a weighed quantity of plastic pellets on a warm roll-mill. The weighed quantity of antioxidant is added to the mill after the polyethylene has been premilled for a short period of time. The plastic containing the antioxidant is then added in weighed quantity to a standard size vessel and melted to give a surface of reproducible size. The vessel is then inserted into a chamber which may be sealed and which is connected to a capillary tube leading to a gas buret and leveling bulb. The apparatus is flushed with oxygen at room temperature, sealed, and the temperature is raised to 150° C. The oxygen pressure is maintained at 1 atmosphere by means of the leveling bulb. The oxygen uptake at the elevated temperature is recorded for the duration of the test. This procedure has been adopted since it has been found that many compounds may inhibit the oxidation for a certain induction period after which time a very sharp increase in the rate of oxygen uptake occurs indicating that the antioxidant has been exhausted. In tests of this nature, it has been found that the compositions of this invention inhibit the absorption of oxygen by the polyethylene to such an extent that they are among the most outstanding antioxidants tested to date even when compared to very closely related compounds. For example, a sample of the polyethylene with no added antioxidant was tested according to this procedure and was found to take up oxygen rapidly with no initial induction period. After 20 hours of heating, over 45 milliliters of oxygen had been absorbed.

The outstanding results obtainable with the antioxidant compounds of this invention in contrast to those obtained with the uninhibited polyethylene are demonstrated by a test which was conducted with 4,4'-thiobis(2-methyl-6- tert-butylphenol), a compound of this invention having the formula:

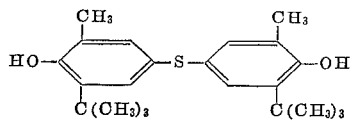

When 0.2 percent of the 4,4'-thiobis(2-methyl-6-tert-butylphenol) was compounded with the same polyethylene as used in the above test, the induction period had not expired after 160 hours of heating at 150° C. That is to say the sample of polyethylene had adsorbed no oxygen after 160 hours of heating. The test was discontinued after 160 hours and the induction period is apparently even longer than this. Thus, the compounds of this invention are outstandingly superior antioxidants for saturated hydrocarbon polymers.

There are several methods available for preparing the inhibited hydrocarbon polymer compositions of this invention. Thus the blending of the 4,4'-thiobis(substituted phenol) compounds of this invention, with a polymer such as, for example, polyethylene, may be carried out on open rolls, on internal mixers or may be accomplished by mixing with extrusion. It is also possible to prepare concentrated batches of the polymer containing excessive amounts of the 4,4'-thiobis(substituted phenol) compounds of this invention and then mix the concentrate with additional polymer to prepare a composition of this invention. The preferred method of compounding the polymers is by milling on heated open holls at slightly elevated temperatures by methods well-known to the art. The temperature range employed is sometimes critical as certain polyethylenes will not melt at low temperatures and tend to stick to the rolls at high temperatures. The 4,4'-thiobis(substituted phenol) compounds of this invention may be initially mixed with the polymer in the dried state or may be first dissolved in a suitable solvent, then sprayed on the polymer and milled in.

Examples of the hydrocarbon polymer compositions of this invention prepared as described above, follow. All parts and percentages are by weight in these examples.

*Example XI*

To 1,000 parts of polyethylene produced by oxygen catalyzed reaction under a pressure of 20,000 atmospheres and having an average molecular weight of 40,000 is added and mixed 2 parts of 4,4'-thiobis(2-methyl-6-tert-butylphenol). The resulting composition has a greatly increased oxidative stability. Excellent results are also obtained when similar quantities of 4,4'-thiobis(2-n-propyl-6-tert-butylphenol), 4,4'-thiobis(2,6-di-tert-butylphenol), 4,4'-thiobis(2-isopropyl-6-sec-butylphenol), 4,4'-thiobis(2-tert-butxoy-6-tert-butylphenol) and the like are employed.

*Example XII*

To 100 parts of polyisobutylene having an average molecular weight of 100,000 is added 0.5 part 4,4'-thiobis(2,6-diisopropylphenol). The oxidative stability of the polymer is greatly increased by the addition of this compound. Excellent results are also obtained with similar quantities of 4,4'-thiobis(2-isopropyl-6-tert-butylphenol) and 4,4'-thiobis(2-isobutoxy-6-isopropylphenol).

*Example XIII*

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 4,4'-trithiobis(2-isopropyl-6-tert-butylphenol). Polyethylene of improved oxidative stability results. Similar results are obtained with 4,4'-trithiobis(2-n-propoxy-6-isobutylphenol), 4,4'-trithiobis(2-methyl-6-isopropylphenol), 4,4'-trithiobis(2-isobutoxy-6-isobutylphenol), and the like.

*Example XIV*

A linear polyethylene having a high degree of crystallinity (up to 93 percent) and below 1 ethyl branched chains per hundred carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.005 percent of 4,4'-thiobis(2-methyl-6-tert-butylphenol), and the resulting product has improved stability characteristics.

*Example XV*

To a polyethylene having an average molecular weight of 1500, a melting point of 88–90° C. and a specific gravity of 0.92 is added 1 percent of 4,4'-dithiobis(2-methoxy-6-tert-butylphenol). After milling in the antioxidant an extremely oxidation resistant product results. Good results are also obtained with such compounds of this invention as 4,4'-dithiobis(2-ethoxy-6-isopropylphenol), 4,4'-dithiobis(2,6-di-sec-butylphenol), 4,4'-dithiobis(2-isopropoxy-6-isopropylphenol), 4,4'-dithiobis(2-ethyl-6-isopropylphenol) and the like.

*Example XVI*

Two parts of 4,4'-trithiobis(2,6-di-tert-butylphenol) are added with milling to 100 parts of a low density polyethylene prepared by high pressure polymerization and which has an average molecular weight of about 20,000. The resulting product is vastly improved in its oxidative stability.

*Example XVII*

To 10,000 parts of a polyethylene having an average molecular weight of about 100,000 and which has a tensile strength of 5400 p.s.i., a Shore D hardness of 70 and a softening temperature of 130° C. under low load is added 10 parts 4,4'-thiobis(2-methyl-6-tert-butylphenol), to prepare a composition of outstanding oxidative stability.

*Example XVIII*

To the polyethylene in Example XIII is added 0.05 percent 4,4'-thiobis(2-isobutyl-6-tert-butylphenol). The resulting composition has improved antioxidant characteristics. Good results are also obtained with 4,4'-thiobis(2-n-butyl-6-isopropylphenol), 4,4'-thiobis(2-ethoxy-6-tert-butylphenol), 4,4'-thiobis(2-propoxy-6-isopropylphenol), 4,4'-thiobis(2-isobutoxy-6-tert-butylphenol) and the like.

*Example XIX*

To a polyisobutylene polymer having an average molecular weight of 35,000 is added sufficient 4,4'-thiobis(2-methyl-6-tert-butylphenol) to give a composition containing 0.03 percent of the antioxidant. The composition has improved antioxidant properties due to the presence of 4,4'-thiobis(2-methyl-6-tert-butylphenol).

In addition to the 4,4'-thiobis(substituted phenol), the saturated hydrocarbon polymers of this invention may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

What is claimed is:
1. A compound having the formula:

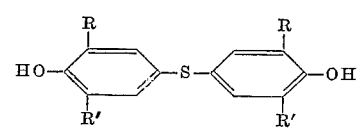

wherein R is an alkyl group branched on the alpha carbon atom and having from 3 to 4 carbon atoms inclusive and R' is an alkoxy group having from 1 to 4 carbon atoms.

2. 4,4'-dithiobis(2-methoxy-6-tert-butylphenol).

3. A compound having the formula

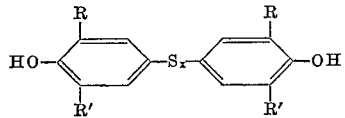

wherein R is an alkyl group branched on the alpha carbon atom and having from 3–4 carbon atoms inclusive, R' is an alkoxy group having from 1–4 carbon atoms and $x$ is an integer from 1–3 inclusive.

References Cited in the file of this patent

UNITED STATES PATENTS

| | | |
|---|---|---|
| 2,434,662 | Latham et al. | Jan. 20, 1948 |
| 2,700,691 | Mayes | Jan. 25, 1955 |
| 2,810,765 | Neuworth et al. | Oct. 22, 1957 |
| 2,814,597 | Wenneis et al. | Nov. 26, 1957 |
| 2,820,775 | Chamberlain et al. | Jan. 21, 1958 |
| 2,822,415 | Albert | Feb. 4, 1958 |
| 2,841,619 | Albert | July 1, 1958 |
| 2,841,628 | Albert | July 1, 1958 |

FOREIGN PATENTS

| | | |
|---|---|---|
| 201,160 | Australia | Apr. 28, 1955 |